March 30, 1965     O. M. WICKEN ETAL     3,175,815
KILN
Filed Nov. 17, 1964
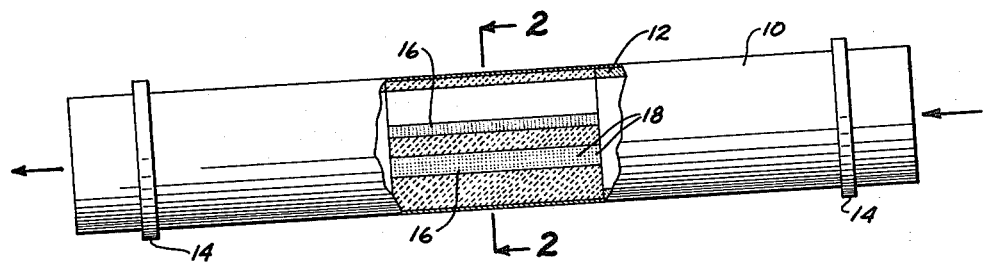
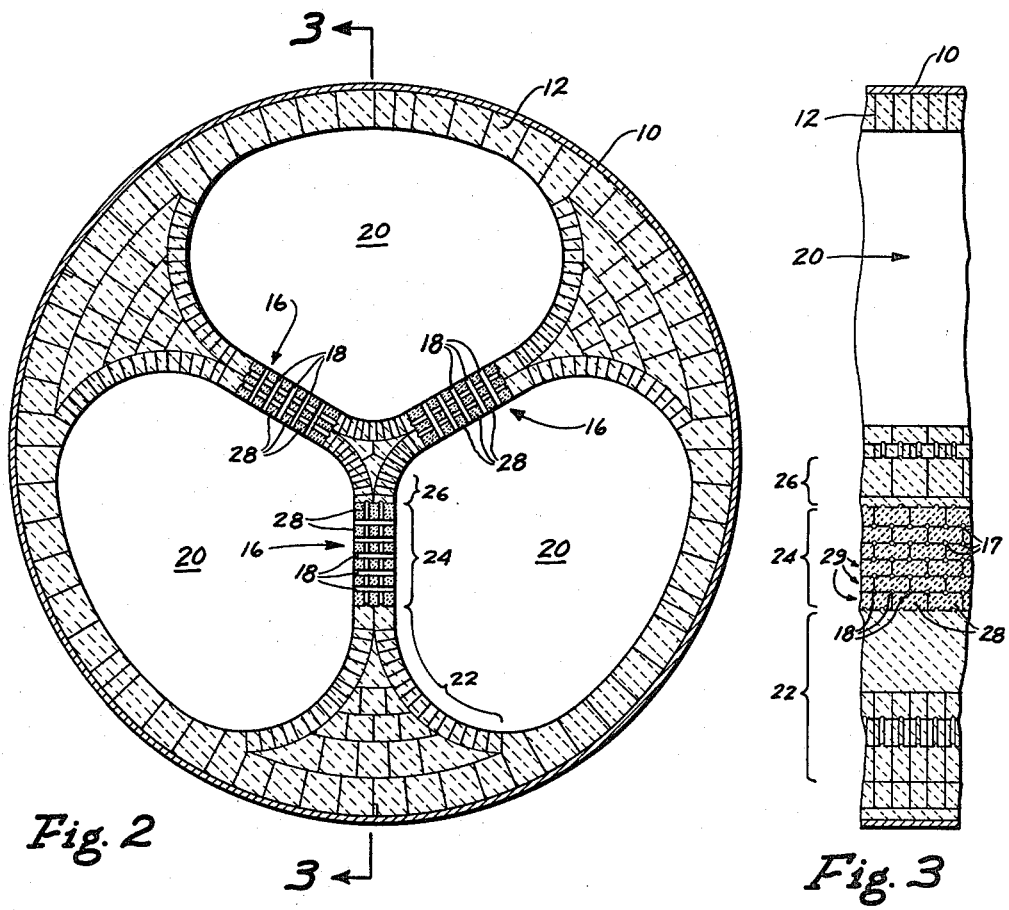
INVENTORS.
OSCAR MILTON WICKEN &
RICHARD R. SCHNEIDER
BY William C. Nealon
ATTORNEY

United States Patent Office 3,175,815
Patented Mar. 30, 1965

3,175,815
KILN
Oscar Milton Wicken and Richard R. Schneider, Pittsburgh, Pa., assignors to Harbison-Walker Refractories Company, Pittsburgh, Pa., a corporation of Pennsylvania
Filed Nov. 17, 1964, Ser. No. 411,873
2 Claims. (Cl. 263—32)

This is a continuation-in-part of application Serial No. 277,567, filed May 2, 1963, now United States Patent No. 3,169,016.

This invention relates to high temperature processing apparatus; and, more particularly, it concerns an improved lifter construction for use in rotary kilns, calciners, dryers, and other rotary processing furnaces or vessels.

Rotary kilns are well known in the art and are generally comprised of an elongated, refractory-lined cylinder adapted to be rotatably supported with its axis inclined so that various types of granular, particulate or, more generally, fluent materials may be made to flow from the upper to the lower end of the cylinder to be heated by counter or concurrently-flowing hot combustion gases. In order to agitate the fluent material and, thus, expose it more completely to the atmosphere of combustion gases in the kiln, heretofore, lifters consisting of small ledges extending from the refractory lining of the kiln toward the center thereof have been used. The lifters function to carry the load of fluent material upwardly on the rising side of the rotating cylinder, and to spill or drop the material downwardly into intimate contact with the combustion gases. They are generally made either from metal for low temperature application, or from certain spall-resistant refractories for high temperature work. Among the major problems incurred by the use of lifters of this type, in the past, has been extremely limited capacity, particularly where the lifter has been formed from refractory material. Principally because of the weak structural characteristics of the refractory material, the lifters can extend only a small distance from the inner wall of the kiln; and, therefore, only a small amount of material can be elevated and dropped through the combustion gas stream. Furthermore, even the most soundly designed refractory lifters heretofore available have been very sensitive to thermal spalling and subject to mechanical breakage.

In accordance with the present invention, the problems previously incurred with rotary kiln lifters are substantially diminished, by providing lifters in the form of apertured radial baffles extending longitudinally of the rotary kiln shell and converging centrally thereof to provide interdependent support of the baffles. In this manner, the desirable heat exchange characteristics of structurally-weak refractory material may be employed while optimum lifting capacities are obtained, with diminished danger of thermal spalling and mechanical breakage.

Accordingly, a principal object of the present invention is the provision in a rotary apparatus for processing fluent material at high temperature of an improved lifter construction, by which the problems heretofore encountered are effectively and substantially overcome.

Another object of this invention is to provide a rotary kiln lifter construction capable of greater lifter capacity, for material resulting in more positive displacement through the center of the kiln gas stream, and better distribution of the material through the gas stream than lifter constructions heretofore available.

A further object of this invention is to provide an improved lifter construction of the type referred to having inherent structural stability, thereby enabling the benefit of contact between the kiln load and much hotter refractory material than was practical with lifters available prior to this invention.

Other objects and further scope of applicability of the present invention will become apparent from the detailed description given hereinafter in conjunction with the attached drawings, wherein like reference numerals designate like parts and in which:

FIG. 1 is a side view of a rotary kiln partially broken away to show the lifter construction of the present invention in central longitudinal section;

FIG. 2 is an enlarged cross section taken along line 2—2 of FIG. 1 and showing a preferred form of the present invention; and FIG. 3 is a section taken along line 3—3 of FIG. 2.

Referring now to the drawings and particularly to FIG. 1, a rotary kiln is shown conventionally including an elongated, cylindrical, metal shell 10 having a lining of refractory brick 12. The axis of the shell 10 is inclined to the horizontal, so that a load of granular, particulate, or generally fluent material may be introduced at its elevated end to flow downwardly through the kiln as it rotates for discharge from its lower end. As is well known to those skilled in this art, the kiln may be supported on tires 14, and rotatably driven by conventional means not shown. Also, in accordance with one conventional practice, hot combustion gases are delivered to the lower end of the kiln to flow upwardly in countercurrent relation to the fluent material load moving downwardly through the kiln.

In accordance with the present invention, a plurality of lifters 16 in the form of radial walls or baffles—each having a plurality of apertures 18 formed therein—extend longitudinally of at least an intermediate portion of the shell 10. In the embodiment illustrated in FIGS. 2 and 3 of the drawing, three baffles 16 are provided and shaped in cross section to define three ovate tunnels 20. Each of the baffles 16 includes an outer section 22, an intermediate or central section 24, and an inner section 26. In the form shown, the outer section 22 of each baffle is built up of refractory brick and mortar to define a fillet shape merging with the refractory lining 12 of the kiln. The inner sections 26 are similarly formed and fillet-shaped, to converge with the central sections, respectively, of the other baffles to provide interdependent support of the baffles at the central axis of the kiln. The intermediate or central section 24 is constructed as a wall of rectangular refractory brick 28, arranged in staggered tiers 29, and having conventional complementing tongues and grooves in the longitudinal direction of the kiln to afford some degree of mechanical interlock. As best shown in FIG. 3, each of the brick 28, in alternate tiers, contains complementary cutouts 17 at each corner thereof and between the tongues and grooves to provide an aperture 18 at the juncture of any three brick and, thus, provide circular apertures at spaced points throughout the central section 24 of the baffle.

In use, the fluent material load will be picked up by the lifters or baffles 16 on the rising side of the rotating kiln and dropped through the apertures 18 into intimate contact with the counterflowing hot combustion gases for effective heat processing. Because of the symmetrical disposition of the baffles about the cylindrical kiln and the manner in which they are afforded interdependent central support, maximum structural support is afforded to the baffles formed of otherwise weak refractory material. Also, the shelf capacity and, thus, the lifting capacity of the baffles 16 approaches an optimum amount because of their extent throughout the complete radius of the kiln.

In this manner a large number of small apertures may be provided without loss of strength in the central section 24. Such an arrangement is desirable, for example, in treating loads of small size particulate material.

Thus, it will be seen from the description given that the above-mentioned objectives are completely fulfilled. The extension of the lifters are baffles 16 from the outer periphery shell across its radial extent to converge at the center affords maximum lifting capacity together with structural stability, thereby enabling the use of high temperature characteristics of refractory material throughout. Moreover, because of the amount of refractory material presented within the kiln coming in contact with the load, considerably improved heat distribution is afforded.

From the above description and the attached drawings it will be apparent to those skilled in this art that numerous modifications of the preferred embodiments described and illustrated herein are possible. Accordingly, it is to be distinctly understood that the foregoing description is illustrative only, not limiting, and that the true spirit and scope of the present invention is to be determined by reference to the appended claims.

We claim:

1. In a rotary kiln of the type including an inclined cylindrical shell having a refractory material lining and adapted to pass a load of fluent material into contact with a stream of hot combustion gases, means for lifting the fluent material and dropping it through the hot combustion gases comprising a plurality of refractory baffles extending at least an intermediate longitudinal portion of the shell, said baffles having an outer fillet-shaped section merging with the refractory lining in the cylindrical shell, an inner fillet-shaped section and an intermediate section extending between said inner and outer sections coverging centrally thereof to provide independent support for said baffles, said intermediate section being formed of staggered tiers of refractory brick consisting at least in part of complementary tongue and groove brick in the longitudinal direction of the kiln, said brick being provided with complementary cutouts which, when aligned, form an aperture at the juncture of any three brick along the length of each baffle to permit the fluent load material to be picked up by said baffles during rising thereof due to rotation of the shell and dropped through the apertures into contact with the counterflowing combustion gases.

2. In a rotary kiln of the type including an inclined cylindrical shell having a refractory material lining and adapted to pass a load of fluent material into contact with a stream of hot combustion gases, a portion of the kiln being provided with three uniformly spaced radial partition walls meeting at the center of the kiln and extending lengthwise of it, said walls being made of refractory material only and shaped to form with said lining a cluster of three tunnels, ovate in cross section, and the opposite sides of the outer portion of each partition wall being concave, each of said radial partition walls being formed of staggered tiers of refractory brick consisting at least in part of complementary tongue and groove brick in the longitudinal direction of the kiln, said brick being provided with complementary cutouts which when aligned form an aperture at the juncture of any three brick along the length of each baffle to permit the fluent load material to be picked up by said baffles during rising thereof due to rotation of the shell and dropped through the apertures into contact with the counterflowing combustion gases.

References Cited by the Examiner

UNITED STATES PATENTS 3,030,091   4/62   Wicken et al. _____ 263—32

FOREIGN PATENTS 948,774   2/49   France.

CHARLES SUKALO, *Primary Examiner.*